United States Patent
Branson et al.

(10) Patent No.: US 9,426,194 B2
(45) Date of Patent: *Aug. 23, 2016

(54) ENDING TUPLE PROCESSING IN A STREAM-BASED COMPUTING APPLICATION

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 126 days.

This patent is subject to a terminal disclaimer.

(21) Appl. No.: 14/540,232

(22) Filed: Nov. 13, 2014

(65) Prior Publication Data

US 2015/0074108 A1    Mar. 12, 2015

Related U.S. Application Data

(63) Continuation of application No. 13/840,322, filed on Mar. 15, 2013, now Pat. No. 9,002,846.

(51) Int. Cl.
*G06F 17/30* (2006.01)
*H04L 29/06* (2006.01)
*H04L 12/26* (2006.01)

(52) U.S. Cl.
CPC .......... *H04L 65/60* (2013.01); *G06F 17/30516* (2013.01); *H04L 43/0888* (2013.01); *H04L 65/4084* (2013.01); *H04L 65/602* (2013.01); *H04L 65/80* (2013.01)

(58) Field of Classification Search
USPC ........................................ 707/718, 736, 803
See application file for complete search history.

(56) References Cited

U.S. PATENT DOCUMENTS

| | | | |
|---|---|---|---|
| 5,577,246 A * | 11/1996 | Priddy | ............... G06F 12/0253 |
| 7,149,359 B1 | 12/2006 | Omoigui | |
| 7,613,848 B2 | 11/2009 | Amini et al. | |
| 7,644,110 B2 | 1/2010 | Nishizawa et al. | |
| 7,730,364 B2 | 6/2010 | Chang et al. | |
| 8,095,690 B2 | 1/2012 | Kashiyama et al. | |

(Continued)

OTHER PUBLICATIONS

Ballard et al., "IBM InfoSphere Streams: Harnessing Data in Motion", Sep. 2010. 360 pages, IBM Redbooks. http://www.redbooks.ibm.com/abstracts/sg247865.html.

(Continued)

*Primary Examiner* — Cam-Linh Nguyen
(74) *Attorney, Agent, or Firm* — Richard A. Wilhelm; Feb. R. Cabrasawan (57) ABSTRACT

A method includes receiving streaming data to be processed by a plurality of processing elements comprising one or more stream operators. Time metadata may be added to a parent tuple at a first stream operator. A first time metric may be determined for a first child tuple of the parent tuple at a second stream operator. The first time metric may be determined, at least in part, from the time metadata. The second stream operator may receive the first child tuple from the first stream operator. The method may include transmitting a second child tuple of the parent tuple from the second stream operator to a third stream operator if the time metric is inside a time limit. In addition, the method may include ending processing of the first child tuple if the time metric is outside of the time limit.

14 Claims, 8 Drawing Sheets

(56) References Cited

U.S. PATENT DOCUMENTS

| | | |
|---|---|---|
| 8,224,898 B2 | 7/2012 | Tripathi et al. |
| 8,335,782 B2 | 12/2012 | Nishizawa et al. |
| 8,402,015 B2 | 3/2013 | Imaki et al. |
| 8,856,182 B2 * | 10/2014 | Olson ............................ 707/797 |
| 2006/0050968 A1 | 3/2006 | Oh et al. |
| 2008/0288255 A1 | 11/2008 | Carin et al. |
| 2009/0112853 A1 | 4/2009 | Nishizawa et al. |
| 2010/0131543 A1 | 5/2010 | Chkodrov et al. |
| 2010/0238801 A1 | 9/2010 | Smith et al. |
| 2012/0041934 A1 | 2/2012 | Srinivasan et al. |
| 2012/0158818 A1 | 6/2012 | Baduge et al. |
| 2012/0218268 A1 | 8/2012 | Accola et al. |
| 2012/0317276 A1 | 12/2012 | Muniraju |
| 2013/0054779 A1 | 2/2013 | Cradick et al. |
| 2013/0080655 A1 | 3/2013 | Barsness et al. |
| 2013/0103832 A1 | 4/2013 | Cradick et al. |
| 2013/0124446 A1 | 5/2013 | Branson et al. |
| 2014/0089373 A1 | 3/2014 | Branson et al. |
| 2014/0136176 A1 | 5/2014 | Branson et al. |
| 2014/0164355 A1 | 6/2014 | Branson et al. |
| 2014/0164356 A1 | 6/2014 | Branson et al. |
| 2014/0164374 A1 | 6/2014 | Branson et al. |
| 2014/0164434 A1 | 6/2014 | Branson et al. |

OTHER PUBLICATIONS

Branson et al., "Ending Tuple Processing in a Stream-Based Computing Application", U.S. Appl. No. 13/840,322, filed Mar. 15, 2013.
"IEEE Standard for a Precision Clock Synchronization Protocol for Networked Measurement and Control Systems", IEEE Std 1588-2008, IEEE Instrumentation and Measurement Society, © 2008 IEEE. DOI: 10.1109/IEEESTD.2008.4579760.
Santosuosso et al., "Management System for Processing Streaming Data", filed Jul. 26, 2011. U.S. Appl. No. 13/190,810.

* cited by examiner

ENDING TUPLE PROCESSING IN A STREAM-BASED COMPUTING APPLICATION

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product may include receiving two or more tuples to be processed by a plurality of processing elements operating on one or more computer processors, each processing element having one or more stream operators.

One embodiment is directed to a method for processing tuples. The method includes receiving two or more tuples to be processed by a plurality of processing elements operating on one or more computer processors. Each processing element may have one or more stream operators. The method may include adding time metadata to a tuple and determining a time metric for a first child tuple of a parent tuple. The time metric may be determined, at least in part, from the time metadata. In addition, the method may include ending processing of the first child tuple if the time metric is outside of a time limit. Further, the method may include receiving the first child tuple at a first stream operator and transmitting a second child tuple of the parent tuple from the first stream operator to a second stream operator if the time metric is inside the time limit. The method may also include ending processing of a second child tuple of the parent tuple. In an embodiment, the one or more stream operators define an operator graph, the operator graph including a zone, and the method may include ending processing of a second child tuple of the parent tuple if the second child tuple is received at a first stream operator within the zone. In one embodiment, the time limit may be a dynamic time limit. In another embodiment, the time limit may be a dynamic time limit that is adaptively determined based on monitoring data.

Another embodiment is directed to a system for processing a stream of tuples. The system may include a plurality of processing elements to receive a stream of tuples. The processing elements may operate on one or more computer processors. Each processing element may have one or more stream operators. A first stream operator may add time metadata to a parent tuple and transmit a first child tuple of the parent tuple a second stream operator. A component may determine a first time metric for the first child tuple at the second stream operator. The first time metric may be determined, at least in part, from the time metadata. The second stream operator may: (a) transmit a second child tuple of the parent tuple from the second stream operator to a third stream operator if the time metric is inside a time limit; and (b) end processing of the first child tuple if the time metric is outside of the time limit. The first stream operator may add a tuple identifier to the parent tuple. In one embodiment, a fourth stream operator may receive a third child tuple of the parent tuple from the first stream operator. If the second stream operator ends processing of the first child tuple if the time metric is outside of the time limit, the fourth stream operator may end processing of third child tuple. In another embodiment, a fourth stream operator may receive a third child tuple of the parent tuple from the first stream operator. If the second stream operator ends processing of the first child tuple if the time metric is outside of the time limit, the fourth stream operator transmits a fourth child tuple of the parent tuple to the fifth stream operator if the second stream operator is inside of a zone and the fourth stream operator outside of the zone. In yet another embodiment, the time limit is a dynamic time limit. In an additional embodiment, a stream manager adaptively determines a dynamic time limit based on monitoring data.

BRIEF DESCRIPTION OF THE DRAWINGS

Like reference numbers and designations in the various drawings indicate like elements.

DETAILED DESCRIPTION

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream-based computing application, stream operators are connected to one another such that data flows from one stream operator to the next (e.g., over a TCP/IP socket). Scalability is achieved by distributing an application across nodes by creating executables (i.e., processing elements), as well as replicating processing elements on multiple nodes and load balancing among them. Stream operators in a stream-based computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream-based computing application.

A "tuple" is data. More specifically, a tuple is a sequence of one or more attributes associated with an entity. Attributes may be any of a variety of different types, e.g., integer, float, Boolean, string, etc. The attributes may be ordered. A tuple may be extended by adding one or more additional attributes to it. In addition to attributes associated with an entity, a tuple may include metadata, i.e., data about the tuple. As used herein, "stream" or "data stream" refers to a sequence of tuples. Generally, a stream may be considered a pseudo-infinite sequence of tuples.

Tuples are received and output by stream operators or processing elements. A tuple corresponding with a particular entity, i.e. a particular piece of data, received by a stream operator or processing element, however, is generally not considered to be the same tuple that is output downstream, even if it corresponds with the same entity or data. Typically, the output tuple is changed in some way by the stream operator or processing element. An attribute or metadata may be added, deleted, or changed. However, it is not required that the output tuple be changed in some way. Generally, a particular tuple output by a stream operator or processing element may not be considered to be the same tuple as a corresponding input tuple even if the input tuple is not changed by the processing element. Because an output tuple may be considered a different tuple from a corresponding input tuple, a parent-child scheme may be useful for tracking tuple flow in an operator graph. In an exemplary scheme, any tuple may be designated a parent tuple. For example, a tuple entering an operator graph or a tuple output by a source operator may be designated as a parent tuple. Generally, when a parent tuple is received by a stream operator or processing element, the output corresponding with the input tuple may be designated a child of the parent. The child tuple may in turn be input to another stream operator or processing element. The output from the second stream operator or processing element corresponding with the input child tuple may also be designated a child of the parent, as further described below. In addition, as mentioned, any tuple may be designated a parent tuple. Accordingly, tuple that is a child of a parent tuple may itself be designated a parent tuple.

Stream-based computing applications handle massive volumes of data that need to be processed efficiently and in real time. For example, a stream-based computing application may continuously ingest and analyze hundreds of thousands of messages per second and up to petabytes of data per day. Accordingly, each stream operator in a stream-based computing application may be required to process a received tuple within fractions of a second. For some applications, tuples must be processed in a sub-millisecond time frame. If the data cannot be analyzed quickly enough, a window of opportunity closes and there is no reason to finish the analysis. In fact, finishing the analysis of a stale tuple may slow down the processing of tuples currently in the operator graph or those that are subsequently received.

One example of data that must be analyzed quickly or else the analysis becomes moot is trading of financial instruments according to an arbitrage strategy. A trading program may be implemented using a stream-based computing application. A stream of data regarding the prices of numerous financial instruments in multiple markets may be input to the operator graph that represents the flow of data through the stream-based computing application. The data stream may include both spot and future prices. The application may be configured to identify temporary differences in price for particular financial instruments on different markets. In many markets, the price disparity typically exists only for a very short period of time and disappears as soon as purchases and sales by market participants seeking to exploit the disparity cause prices on the various markets to converge. The application may be configured to automatically initiate simultaneous buy and sell orders for the instrument in two or more markets in order to profit from the price difference. The data stream input may include hundreds of thousands of prices on thousands of financial instruments. Thus, the input data stream may include many hundreds of thousands of tuples. The time period for analysis of multiple tuples containing price data for different markets to determine whether any of the price data presents an arbitrage opportunity may be substantially less than one millisecond. If analysis of particular tuples in the operator graph indicates an arbitrage opportunity, simultaneous orders must be generated in a sub-millisecond time frame. If the analysis is not completed within the time window, there is no reason to finish the analysis as the price disparity will have likely vanished.

Embodiments disclosed herein are directed to methods, systems, and computer program products for ending processing of a tuple before it reaches the end or other point of an operator graph or execution path. Processing may be ended based on any suitable time related condition or other condition. Processing may be ended, for example, if it is determined that a time-sensitive operation using the tuple cannot be completed in time for the result of that operation to be useful.

Figure 1:
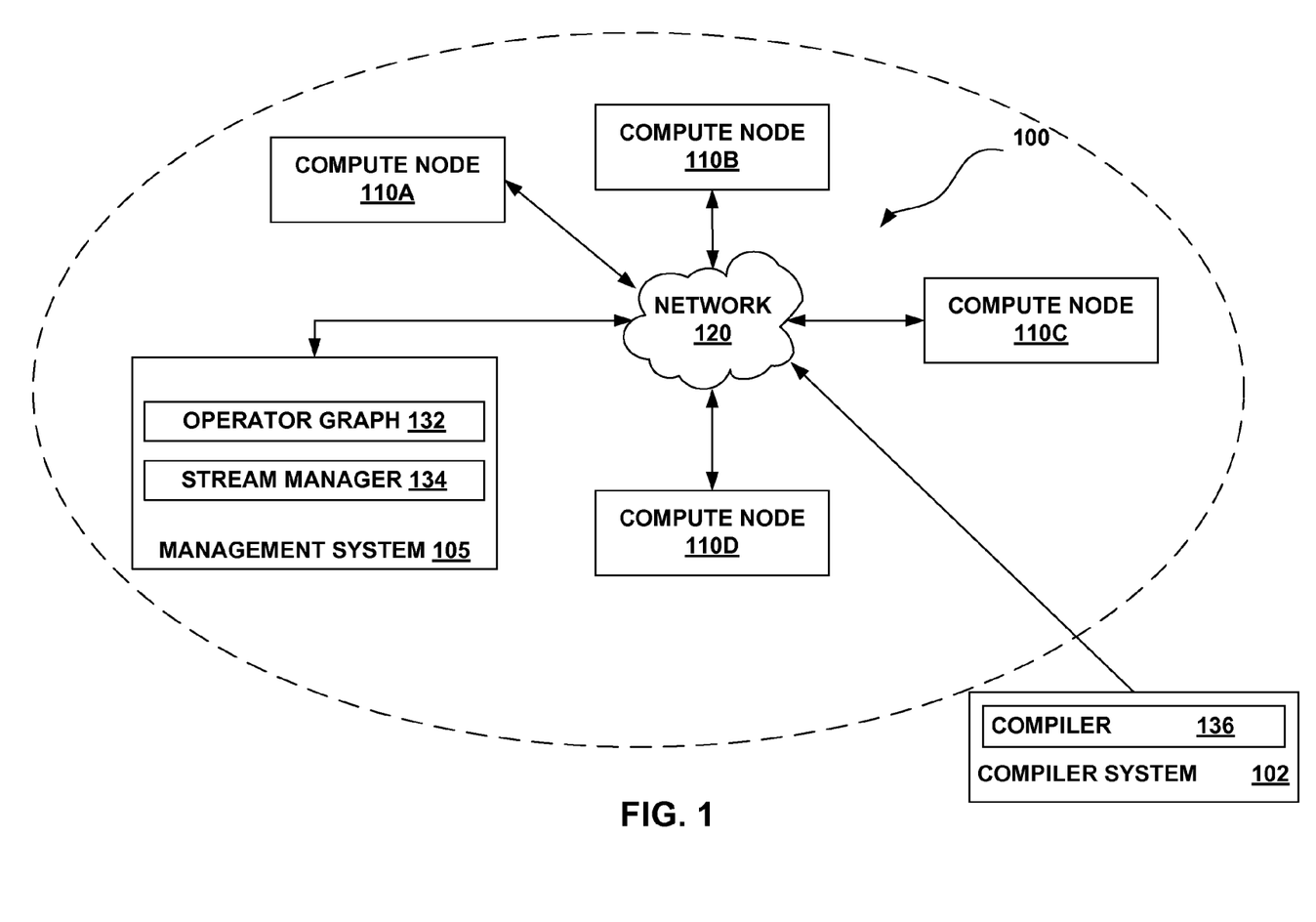
FIG. 1 illustrates a computing infrastructure configured to execute a stream-based computing application according to various embodiments.

FIG. 1 illustrates one exemplary computing infrastructure 100 that may be configured to execute a stream-based computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 2:
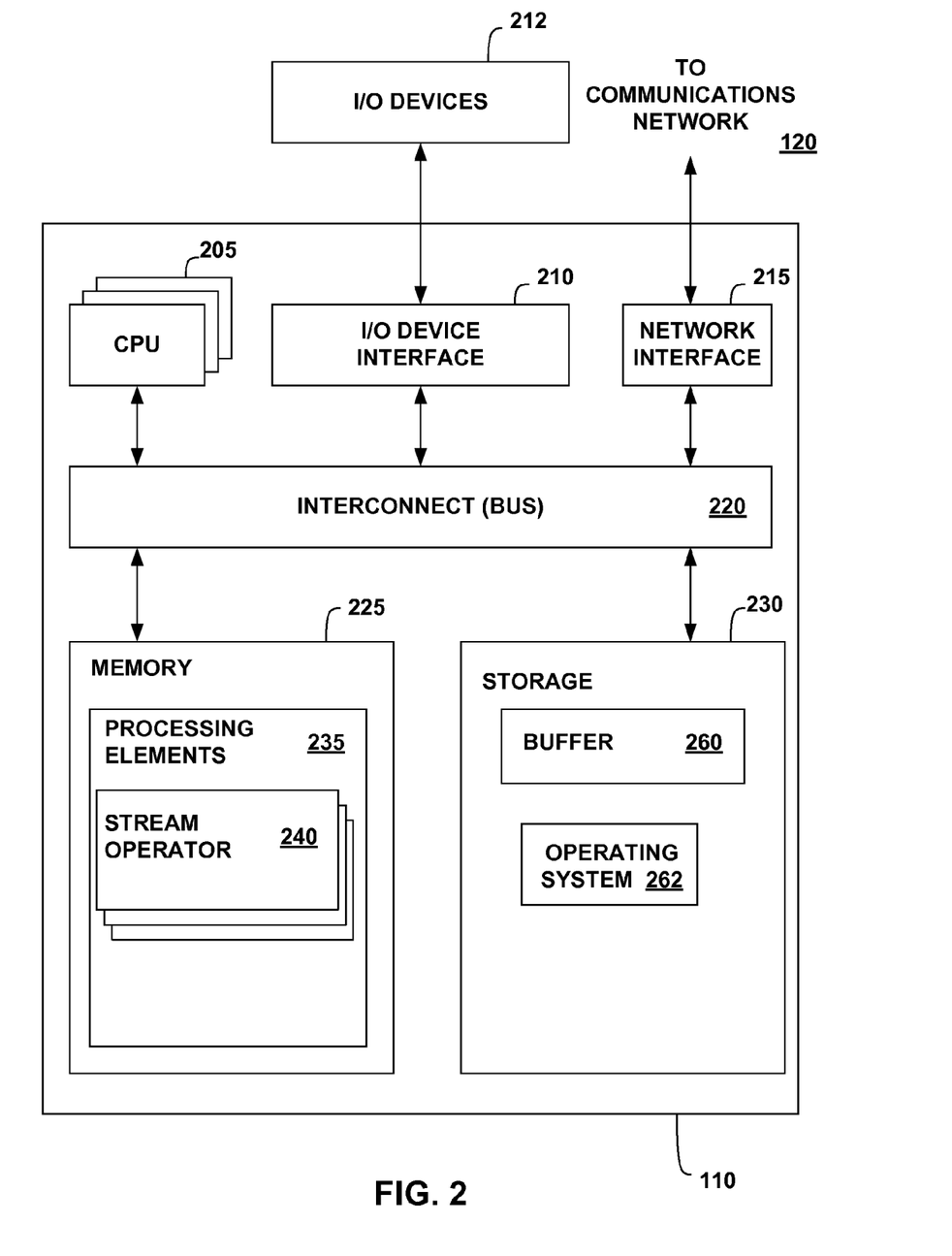
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream-based computing application. In addition, an operating system provides common services for application programs, such as providing a time function. A time function may employ a hardware clock, a software clock, or a network clock. A network-type time function may use a network time protocol in which all compute nodes on a network are synchronized with the same time server. In one embodiment, a time function may employ IEEE 1588-2008 (Precision Time Protocol or PTP Version 2).

A streams application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream-based computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

Figure 3:
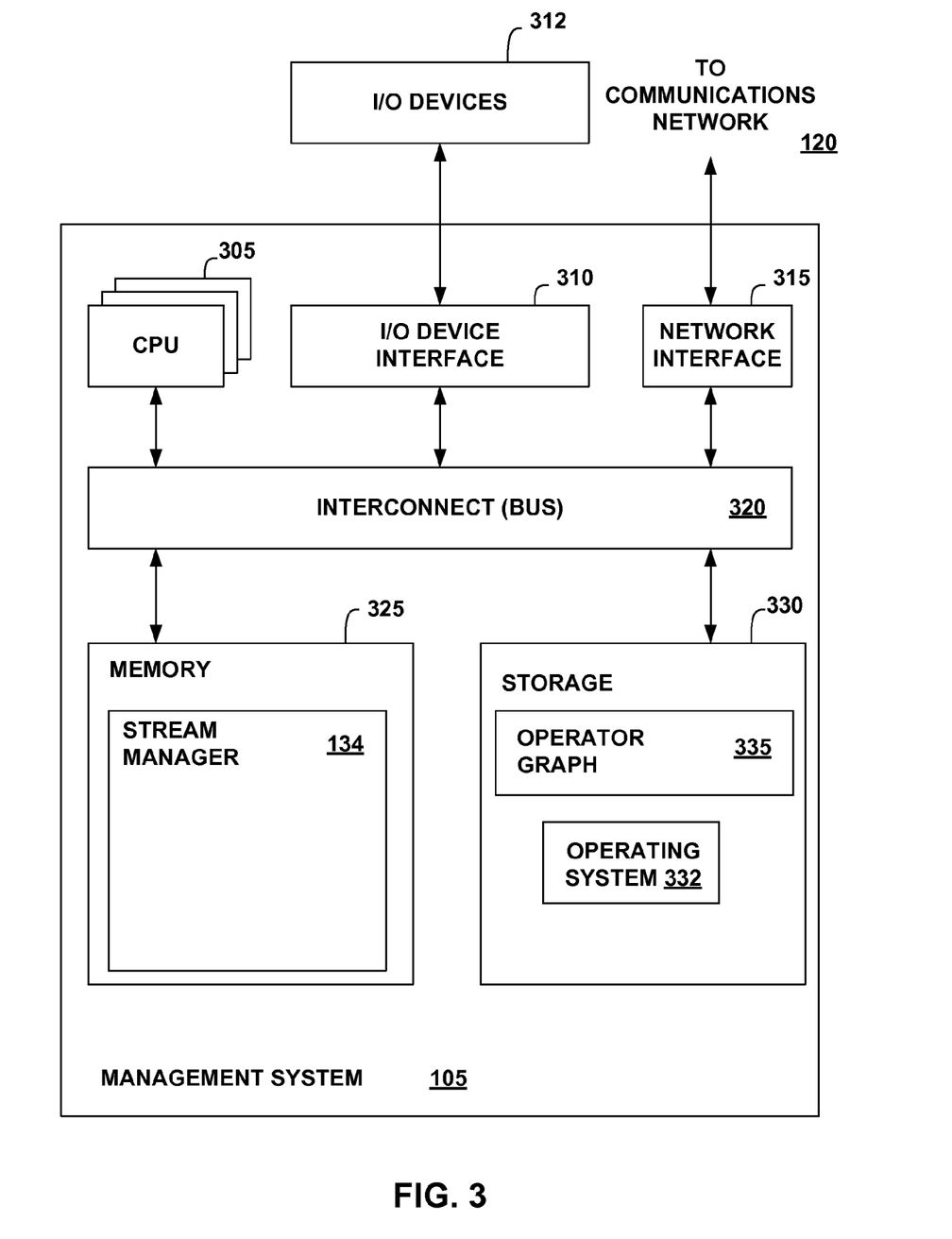
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream-based computing application. In addition, an operating system provides common services for application programs, such as providing a time function. A time function may employ a hardware clock, a software clock, or a network clock. A network-type time function may use a network time protocol in which all compute nodes on a network are synchronized with the same time server. In one embodiment, a time function may employ IEEE 1588-2008.

The memory 325 may store a stream manager 134. Additionally, the storage 330 may store an operator graph 335. The operator graph 335 may define how tuples are routed to processing elements 235 (FIG. 2) for processing.

Figure 4:
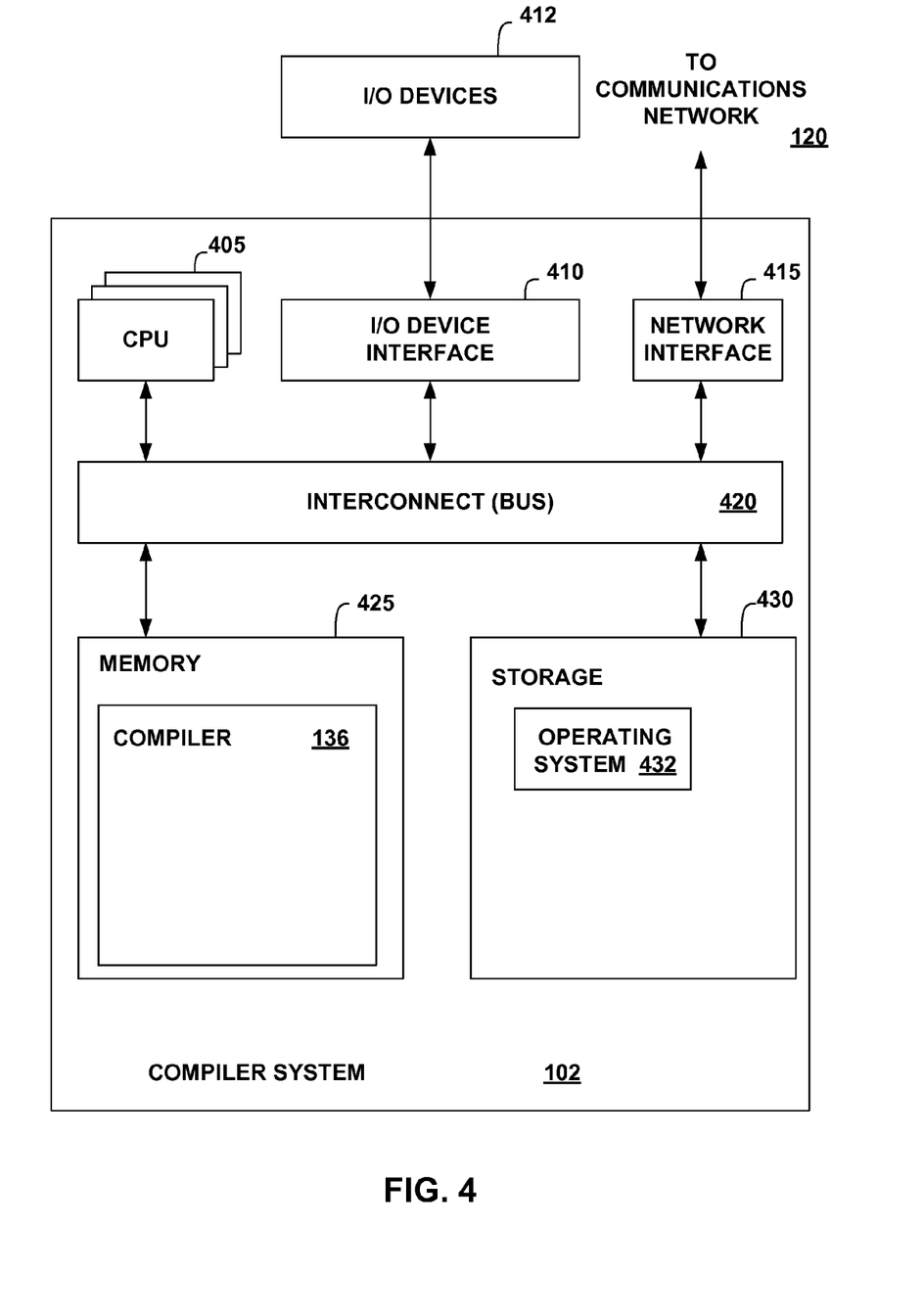
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream-based computing application. In addition, an operating system provides common services for application programs, such as providing a time function. A time function may employ a hardware clock, a software clock, or a network clock. A network-type time function may use a network time protocol in which all compute nodes on a network are synchronized with the same time server. In one embodiment, a time function may employ IEEE 1588-2008.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the streaming application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
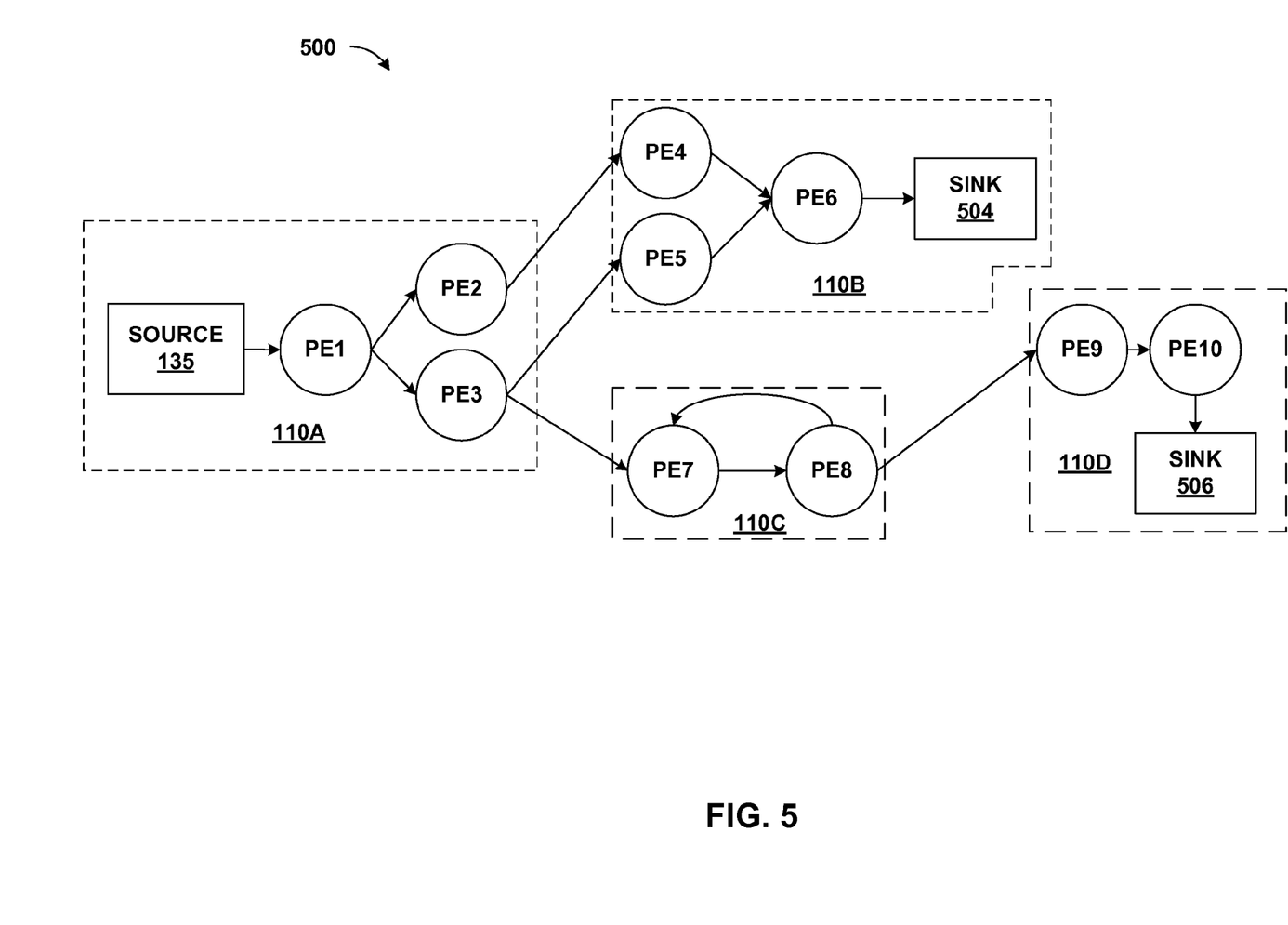
FIG. 5 illustrates an operator graph for a stream-based computing application according to various embodiments.

FIG. 5 illustrates an exemplary operator graph 500 for a stream-based computing application beginning from one or more sources 135 through to one or more sinks 504, 506, according to some embodiments. This flow from source to sink may also be generally referred to herein as an execution path. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins).

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. In one embodiment, the tuples received by PE1 may be designated parent tuples and the tuples output by PE1 may be designated child tuples. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream-based computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream-based computing application by inserting, removing, fusing, un-fusing, or otherwise modifying the processing elements and stream operators (or what tuples flow to the processing elements) running on the compute nodes 110A-110D. In addition, a stream manager 134 may perform any operation disclosed in this Detailed Description for ending processing of a tuple before the tuple reaches the end or other point of an operator graph or execution path. The operations the stream manager 134 may perform include determining a time metric, determining whether a time metric is within a time limit, or causing processing of a tuple to end.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity. According to various embodiments, processing of a tuple may be ended before the tuple reaches the end of an execution path.

In one embodiment, a time stamp and a unique tuple identifier may be added or appended to a tuple arriving at a stream operator in the processing element PE1. The time stamp may specify an initial time to that the tuple arrives at PE1. The processing element PE1 may process the tuple and may output a new tuple to PE3. At processing element PE3, the difference between the initial time stamp to and a current time $t_C$ may be determined and compared with a maximum-time-in-graph parameter or threshold $t_{MAX}$. The new tuple may be processed if the difference is less than $t_{MAX}$. However, processing of the new tuple may be ended if the difference is greater than $t_{MAX}$.

In an alternative embodiment, the time stamp added or appended to the new tuple arriving at PE3 may specify an expiration time $t_{EXP}$. In this alternative, when the new tuple arrives at processing element PE3, the expiration time $t_{EXP}$ and a current time $t_C$ may be compared. The new tuple may be processed if the current time current time $t_C$ is less than the expiration time $t_{EXP}$. On the other hand, processing of the new tuple may be ended if the current time current time $t_C$ is greater than $t_{EXP}$.

Figure 6:
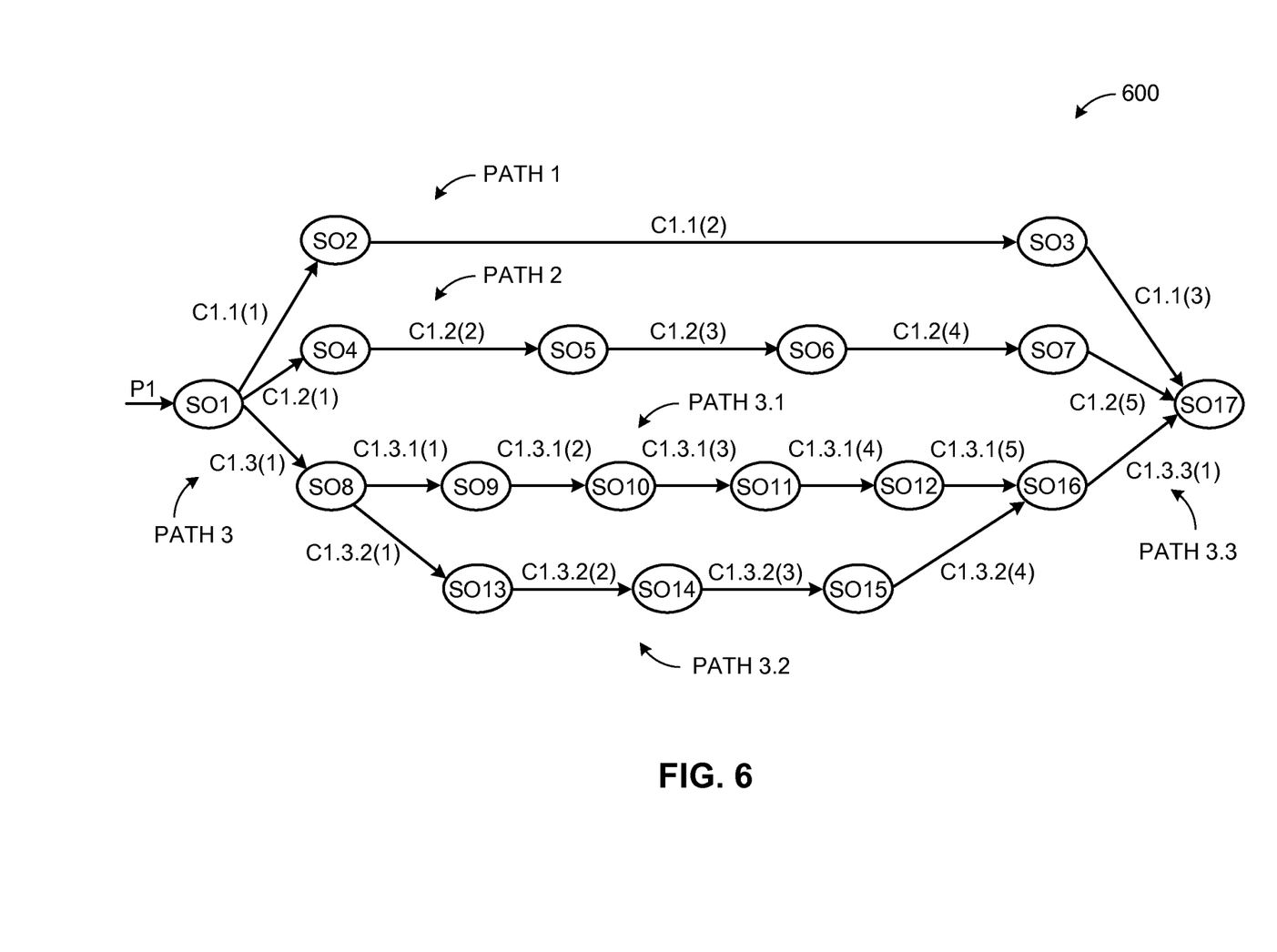
FIG. 6 illustrates an exemplary tuple identification scheme for an operator graph that may be used in some embodiments.

FIG. 6 illustrates an exemplary tuple identification scheme for an operator graph 600 that may be used in some embodiments. The operator graph 600 may be an entire operator graph or a portion of an operator graph for a stream-based computing application. Tuples may be input to the operator graph 600 at stream operator SO1. Processing of input tuples may conclude at operator SO17, which may be a sink operator. The exemplary tuple identification scheme shows unique identifiers for parent and possible child tuples. In alternative embodiments, any suitable scheme for uniquely identifying parent and child tuples may be employed.

In FIG. 6, the stream operator SO1 is shown receiving a parent tuple P1. In this identifier, "P" designates that the tuple is a parent tuple and the "1" designates a unique number identifying the parent tuple. P1 is one example of a "parent tuple identifier." The stream operator SO1 outputs three children of P1. The child tuples C1.1(1), C1.2(1), and C1.3(1). In these identifiers, the "C" designates the tuple as a child and the first "1" is the unique identifying number of the particular parent tuple. The identifiers for child tuples include the parent's identification number. C1.1(1), C1.2(1), and C1.3(1) are examples of "child tuple identifiers." The stream operator SO1 outputs the three children of P1 to stream operators SO2, SO4, and SO8. The respective paths for SO1 to SO2, SO4, and SO8 may be designated path 1, path 2, and path 3. In the identifier C1.1(1), the ".1(1)" indicates that this child tuple is output on the first segment of path 1. In the identifier C1.2(1), the "0.2(1)" indicates that this child tuple is output on the first segment of path 2. In the identifier C1.3(1), the "0.3(1)" indicates that this child tuple is output on the first segment of path 3.

Path 1 includes stream operators SO2 and S03. Stream operator SO2 receives child tuple C1.1(1) on the first segment of path 1 and outputs C1.1(2) on the second segment of path 1. Stream operator SO3 receives child tuple C1.1(2) on the second segment of path 1 and outputs child C1.1(3) on the third segment of path 1. Stream operator SO17 receives the child tuple C1.1(3).

Path 2 includes stream operators SO4, SO5, SO6, and SO7. Child tuples C1.2(2), C1.2(3), C1.2(4), and C1.2(5) are output from stream operators SO4, SO5, SO6, and SO7, respectively. Stream operator SO17 receives the child tuple C1.2(5).

Path 3 includes three paths or sub-paths 3.1, 3.2, and 3.3. The stream operators SO9, SO10, SO11, and SO12 form a first path included within path 3. Child tuples C1.3.1(1), C1.3.1(2), C1.3.1(3), C1.3.1(4) and C1.3.1(5) are output from stream operators SO8, SO9, SO10, SO11, and SO12, respectively. The stream operators SO13, SO14, and SO15 form a second path included within path 3. Child tuples C1.3.2(1), C1.3.2(2), C1.3.2(3), and C1.3.2(4) are output from stream operators SO8, SO13, SO14, and SO15, respectively. The second "1" in the identifiers for child tuples output from stream operators SO8, SO9, SO10, SO11, and SO12 designates that these child tuples are output on a segment of the first path included within path 3. For example, the second "1" in tuple C1.3.1(1) output from stream operator SO8 designates the first path 3.1 included within path 3. Similarly, the "2" in the identifiers for child tuples output from stream operators SO8, SO13, SO14, and SO15 designates that these child tuples are output on a segment of the second path included within path 3. For example, the "2" in tuple C1.3.2(1) output from stream operator SO8 designates the second path 3.2 included within path 3.

In the exemplary operator graph 600, the first and second paths included in path 3 merge at stream operator SO16. Stream operator SO16 outputs child tuples to stream operator SO17 on a third path 3.3 included within path 3. The second "3" in the identifiers for child tuples output from stream operator SO16 designates that these child tuples are output on a segment of the third path 3.3 included within path 3.

According to various embodiments, time metadata may be added to tuples at a stream operator. When time metadata is added to a parent tuple, the time metadata may be included in each child tuple of the parent tuple. The time metadata may be a time stamp indicating a current time. Alternatively, the time metadata may be an expiration time or other future time. In another alternative, time metadata may include a time limit or period in which the tuple should be processed to satisfy a time-based condition. The time metadata may include the time a tuple is received or the time a tuple is output from a stream operator. Time metadata may be added to tuples at any stream operator in an operator graph. In one embodiment, time metadata may be added at every stream operator in an operator graph. After time metadata is added to a tuple at a first stream operator, the tuple may be transmitted to a second stream operator according to an operator graph. The second stream operator may be any stream operator which receives the tuple, directly or indirectly, from the first stream operator. A time metric may be determined for the tuple at the time the tuple is received at the second stream operator. Alternatively, the time metric may be determined for the tuple at the time the tuple is ready to be output from the second stream operator. The time metric may be determined from the time metadata previously added to the tuple. For example, the time metric may be a time period determined by comparing a current time with a time stamp. Accordingly, the time period may correspond with the time that the particular tuple has been in the operator graph. As another example, the time metric may be a binary true or false value, determined by comparing an expiration time with a current time, wherein true corresponds with the current time being later than the expiration time.

In one embodiment, a time stamp may be determined for a tuple arriving at a stream operator, however, the time stamp is not added or appended to the tuple or a corresponding tuple output from the stream operator. Rather, the time stamp may be included in a separate tuple. The separate tuple may additionally include the tuple identifier for the tuple associated with the time stamp. In one embodiment, two or more time stamps may be included in a tuple separate from the tuples for which the time stamps pertain.

According to various embodiments, it may be determined whether the time metric is outside of a time limit. This determination may be made before, during, or following any processing of the tuple at the second stream operator. This determination as to whether the time metric is outside of a time limit may be performed once the time metric is determined. Alternatively, it may be determined concurrently with the determination of the time metric. The time limit may be a period of time. Alternatively, the time limit may be a particular time after the time metadata was added to the tuple. As one example, the time metadata added to the tuple at the first stream operator may specify an initial time $t_0$. The time metric may be a difference between the time metadata value of to and a current time $t_C$ at a second stream operator. The time metric may be determined to be, for example, 600 milliseconds. If the time limit is 500 milliseconds, the time metric is outside of the time limit. On the other hand, if the time metric is determined to be 450 milliseconds, the time metric is within or inside of the time limit of 500 milliseconds.

According to various embodiments, processing of a tuple may be ended if the time metric is outside of the time limit. Conversely, the first tuple may be transmitted from the second stream operator to a third stream operator if the time metric is within the time limit. The third stream operator may be any stream operator which could receive the tuple, directly or indirectly, from the second stream operator, according to an operator graph.

Figure 7:
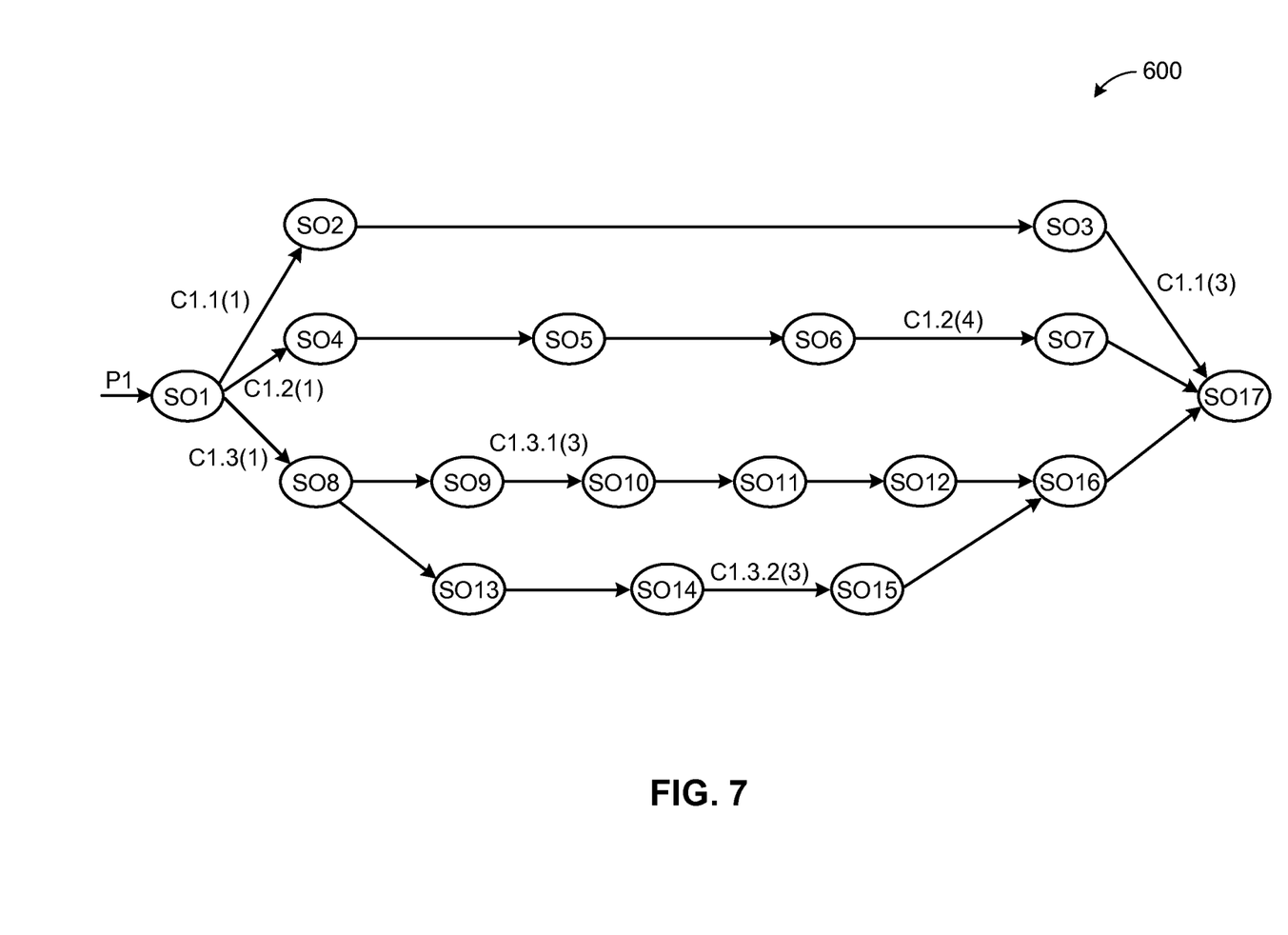
FIG. 7 illustrates the operator graph of FIG. 6 according to an embodiment.

Examples of tuple processing are presented in FIG. 7 with reference to the exemplary operator graph 600. The stream operator SO1 receives parent tuple P1 and outputs child tuples C1.1(1), C1.2(1), and C1.3(1). Time metadata may be added to the child tuples C1.1(1), C1.2(1), and C1.3(1). The child tuples follow different paths through the operator graph. Some paths may take longer to traverse than others for a variety of reasons. For example, a path may have more stream operators than other paths. A path may include stream operators that take longer to perform operations than stream operators on other paths. A path may perform more analysis than other paths. A path may take longer than other paths because it is affected by a heavy workload, or a network or hardware performance issue.

In a first example, at a current time $t_C$, the child tuple C1.1(3) may be at the stream operator SO17. A time metric may be determined for the tuple C1.1(3) at the current time $t_C$, which may be the time the tuple is received at or ready to be output from stream operator SO17. Alternatively, the current time $t_C$ may be any suitable time during which the tuple is processed at the stream operator SO17. The time metric may be compared with the current time $t_C$ to determine whether the time metric is outside of a time limit. In this example, the time metric for the child tuple C1.1(3) is within the time limit and the stream operator SO17 may process the tuple.

In a second example, at a current time $t_C$, the child tuple C1.1(3) may be at the stream operator SO17, the child tuple C1.2(4) may be at the stream operator SO7, the child tuple C1.3.1(3) may be at the stream operator SO10, and the child tuple C1.3.2(3) may be at the stream operator SO15. A time metric may be determined for the tuple C1.3.1(3) at SO10 at the current time $t_C$. The time metric may be compared with the current time $t_C$ to determine whether the time metric is outside of a time limit. In this example, the time metric for the child tuple C1.3.1(3) is outside of the time limit. In one embodiment, processing may be ended for the child tuple C1.3.1(3). In addition, processing may be ended for the child tuples C1.1(3), C1.2(4), and C1.3.2(3). In various embodiments, if the time metric for a tuple is outside of a time limit, processing is ended for that tuple, its parent, and all child tuples descended from the parent tuple.

If processing is ended for a tuple, it is not transmitted to a next stream operator or processing element. In the second example above, the child tuple C1.2(4) is not transmitted to SO17, the child tuple C1.3.1(3) is not transmitted to SO11, and the child tuple C1.3.2(3) is not transmitted to SO16. Because the time spent processing child tuple C1.3.1(3) is outside the time limit, the reason to finish the analysis of these tuples may be moot. In fact, transmitting the tuples to stream operators down the respective paths may slow down the processing of other tuples in the operator graph or those that are subsequently received.

In various embodiments, operations for determining a time metric, determining whether the time metric is within a time limit, and ending processing may be performed by a stream operator, processing element, or by the stream manager 134. In addition, as the example of FIG. 7 illustrates, processing may be ended for all child tuples associated with a parent tuple identifier if a time limit is reached. In other words, a tuple and all of its children may be removed from an operator graph if a particular time-in-graph limit is reached. In other embodiments, processing may be ended only for the tuple for which the particular time-in-graph limit is reached.

Figure 8:
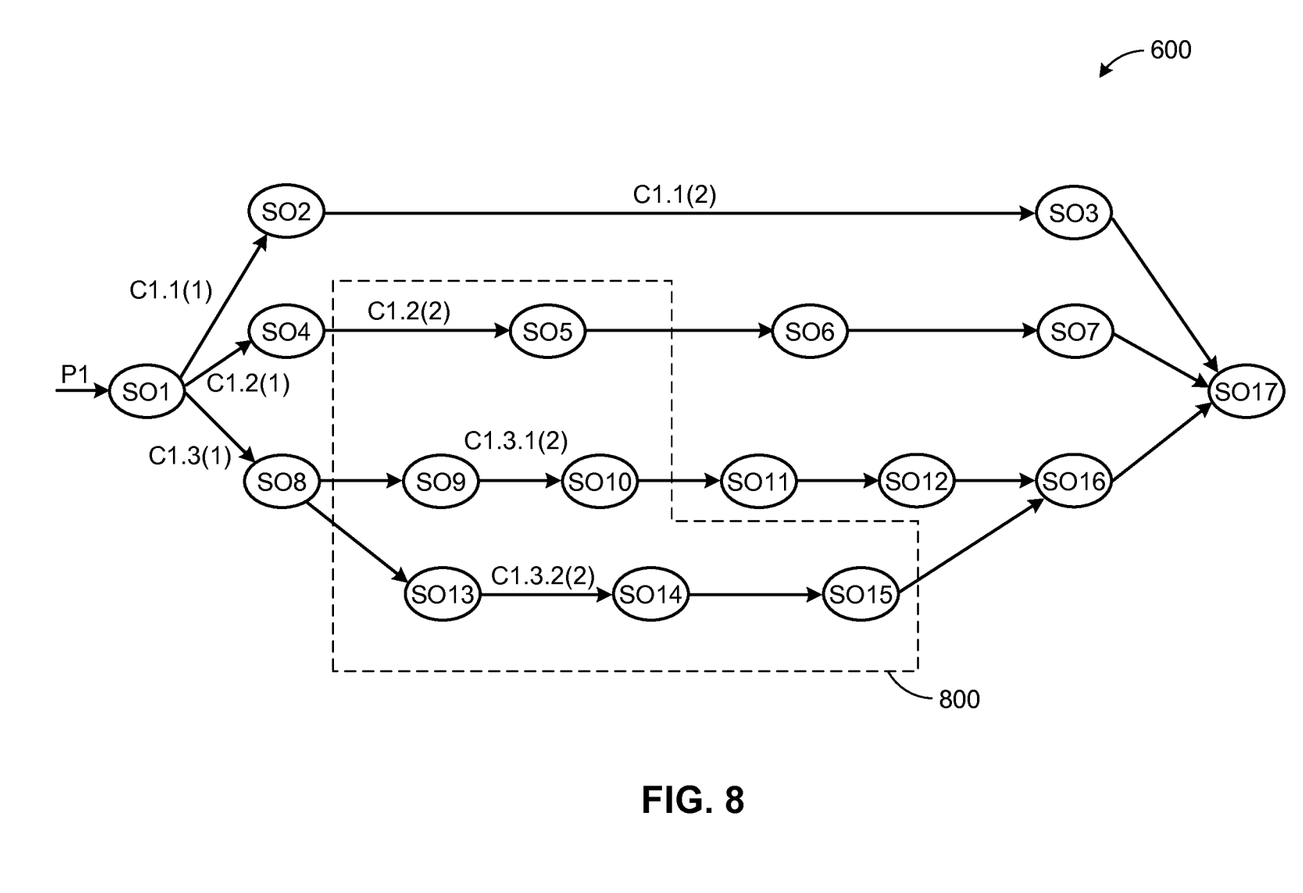
FIG. 8 illustrates the operator graph of FIG. 6 according to another embodiment.

An operator graph may have one or more zones or regions. FIG. 8 illustrates a zone 800 for the exemplary operator graph 600. As mentioned, time metadata may be added to tuples at any stream operator in an operator graph. In one embodiment, time metadata may be added to tuples at one or more first stream operators. Operations may be performed for determining a time metric and determining whether the time metric is within a time limit at any current time $t_C$. However, processing is only ended for a tuple if the time metric is outside the time limit and the tuple is at a stream operator within the zone 600.

In the example of FIG. 8, time metadata is added to child tuples C1.1(1), C1.2(1), and C1.3(1) at stream operator SO1. At a current time $t_C$, the child tuple C1.1(2) may be at the stream operator SO3, the child tuple C1.2(2) may be at the stream operator SO5, the child tuple C1.3.1(2) may be at the stream operator SO10, and the child tuple C1.3.2(2) may be at the stream operator SO14. Time metrics may be determined for these tuples at the current time $t_C$. In addition, the time metrics may be compared with the current time $t_C$ to determine whether the respective time metrics are outside of a time limit. In this example, assume the time metrics for the child tuples C1.1(2), C1.2(2), C1.3.1(2), and C1.3.2(3) are all outside of the time limit. Inn one embodiment, processing may be ended for the child tuples C1.2(2), C1.3.1(2), and C1.3.2(3) that are within the zone 800. However, processing may be continued for the child tuple C1.1(2) that is outside of the zone 800 even though its time metric is outside of the time limit.

The time limit that a time metric is compared with may be specified by a user using a graphical user interface in one embodiment. In one embodiment, the time limit is a static time limit. In an alternative embodiment, the time limit may be dynamic. For example, under certain conditions, the time limit may be a first time period and, under other conditions, the time limit may be a second time period. The first and second time periods may be different. In another alternative, time limits may be continuously input to a stream-based computing application.

In an embodiment, a stream-based computing application may include a component, such as the stream manager 134, that monitors the application to determine whether tuples are being processed through the entire operator graph or one or more segments of the operator graph fast enough to satisfy any suitable time related condition. Monitoring may be performed without determining a time metric for tuples or without comparing a time metric with a time limit. Alternatively, monitoring may be performed with the application determining a time metric for tuples and comparing the time metric with a particular time limit. If the monitoring indicates that one or more particular tuples were not "fully processed" in time to satisfy the time related condition, the component may cause the application to begin determining a time metric for tuples and comparing the time metric with a particular time limit. Alternatively, the component may adaptively determine a new time limit based on monitoring data. In this context, fully processed refers to a tuple and its associated child tuples traversing all or a specified portion of an operator graph or execution path within a time limit. Monitoring may be continuous and the stream-based computing application may periodically determine revised processing time limits.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream-based computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream-based computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A computer program product for processing a stream of tuples, the computer program product comprising a non-transitory computer readable storage medium having program code embodied therewith, the program code comprising computer readable program code configured to:
   receive two or more tuples to be processed by a plurality of processing elements operating on one or more computer processors, each processing element having one or more stream operators;
   add time metadata to a parent tuple at a first stream operator;
   determine a first time metric for a first child tuple of the parent tuple at a second stream operator, the first time metric being determined, at least in part, from the time metadata, the second stream operator receiving the first child tuple from the first stream operator;
   transmit a second child tuple of the parent tuple from the second stream operator to a third stream operator if the time metric is inside a time limit; and
   end processing of the first child tuple if the time metric is outside of the time limit.

2. The program product of claim 1, further comprising adding a tuple identifier to the parent tuple at the first stream operator.

3. The program product of claim 1, further comprising a fourth stream operator receiving a third child tuple of the parent tuple from the first stream operator, wherein the ending of processing of the first child tuple if the time metric is outside of the time limit includes ending processing of third child tuple.

4. The program product of claim 1, further comprising a fourth stream operator receiving a third child tuple of the parent tuple from the first stream operator, wherein the ending of processing of the first child tuple if the time metric is outside of the time limit includes:
   transmitting a fourth child tuple of the parent tuple from the fourth stream operator to a fifth stream operator if the second stream operator is inside of a zone and the fourth stream operator outside of the zone.

5. The program product of claim 1, wherein the time limit is a dynamic time limit.

6. The program product of claim 5, further comprising adaptively determining a dynamic time limit based on monitoring data.

7. A system for processing a stream of tuples, comprising:
   a plurality of processing elements to receive a stream of tuples, the processing elements operating on one or more computer processors, each processing element having one or more stream operators;
   a first stream operator to add time metadata to a parent tuple and to transmit a first child tuple of the parent tuple a second stream operator;
   a component to determine a first time metric for the first child tuple at the second stream operator, the first time metric being determined, at least in part, from the time metadata; and
   wherein the second stream operator:
      transmits a second child tuple of the parent tuple from the second stream operator to a third stream operator if the time metric is inside a time limit; and
      ends processing of the first child tuple if the time metric is outside of the time limit.

8. The system of claim 7, wherein the first stream operator adds a tuple identifier to the parent tuple.

9. The system of claim 7, further comprising a fourth stream operator to receive a third child tuple of the parent tuple from the first stream operator, wherein:
- the ending of processing of the first child tuple if the time metric is outside of the time limit by the second stream operator includes ending processing of third child tuple.

10. The system of claim 7, further comprising a fourth stream operator to receive a third child tuple of the parent tuple from the first stream operator and a fifth stream operator, wherein:
- the ending of processing of the first child tuple if the time metric is outside of the time limit by the second stream operator includes transmitting a fourth child tuple of the parent tuple from the fourth stream operator to the fifth stream operator if the second stream operator is inside of a zone and the fourth stream operator outside of the zone.

11. The system of claim 7, wherein the time limit is a dynamic time limit.

12. The system of claim 11, further comprising a stream manager to adaptively determine a dynamic time limit based on monitoring data.

13. The system of claim 7, wherein the component to determine a first time metric is a stream operator.

14. The system of claim 7, further comprising a stream manager, wherein the component to determine a first time metric is the stream manager.

* * * * *